3,245,557
APPARATUS FOR STACKING ARTICLES IN
PREDETERMINED ORIENTATION
Michael D. Maramonte, South Milwaukee, and John A.
Werner, Wauwatosa, Wis., assignors, by mesne assignments, to Michael D. Maramonte and John Conta
Filed Nov. 14, 1961, Ser. No. 152,310
2 Claims. (Cl. 214—6)

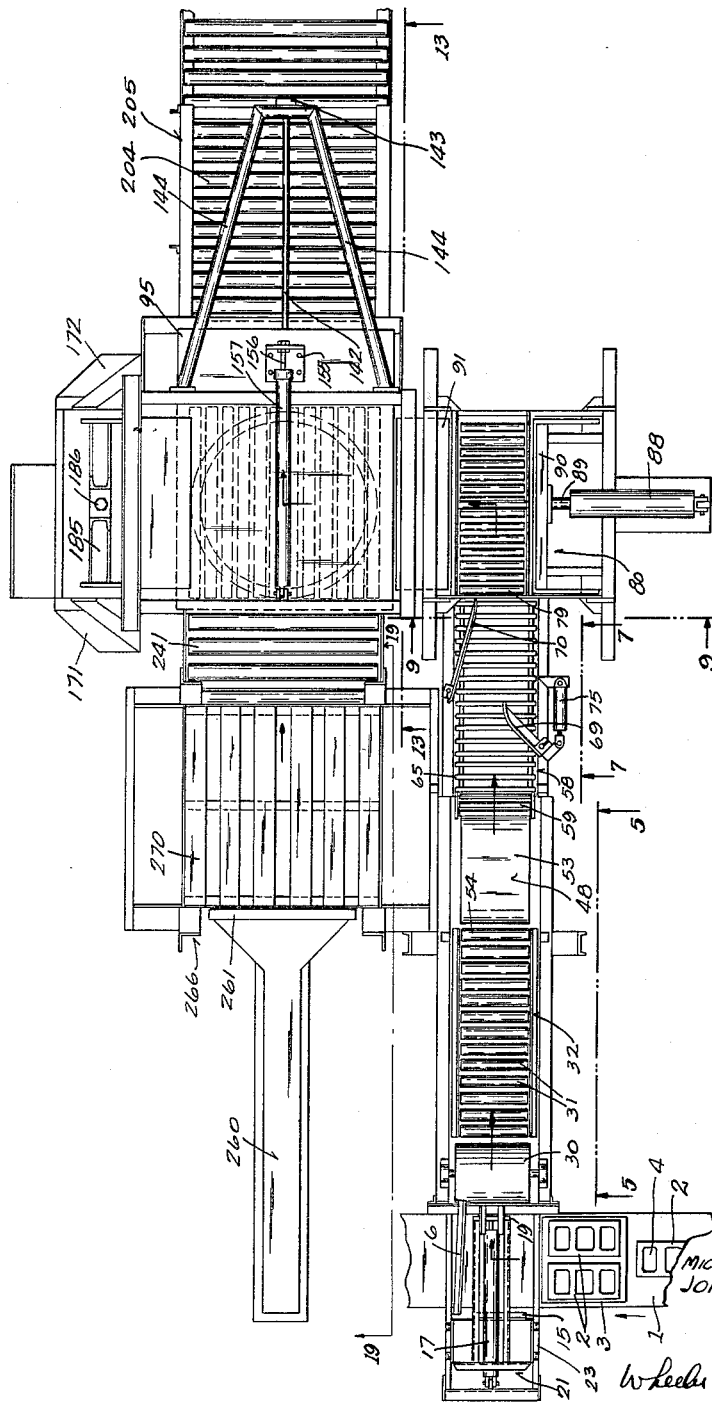

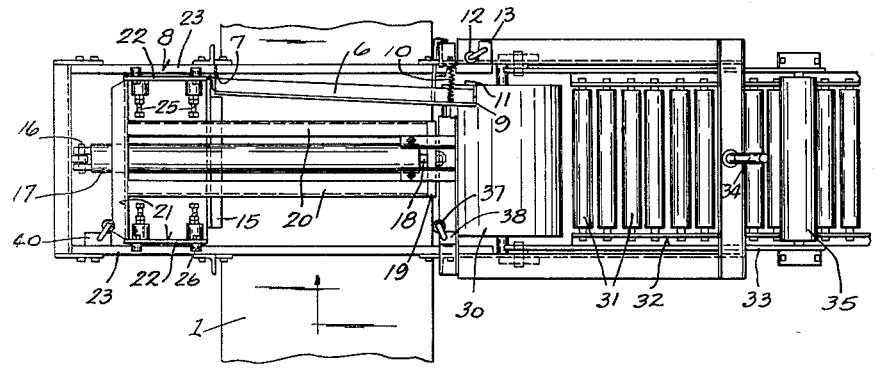
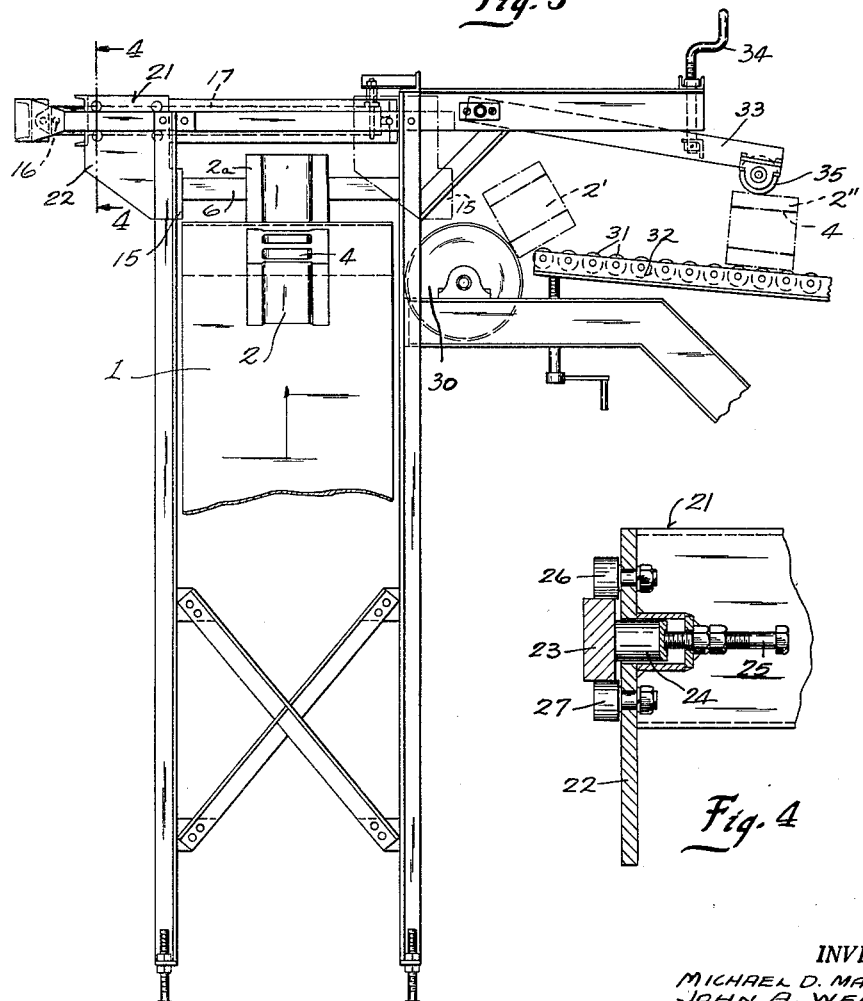

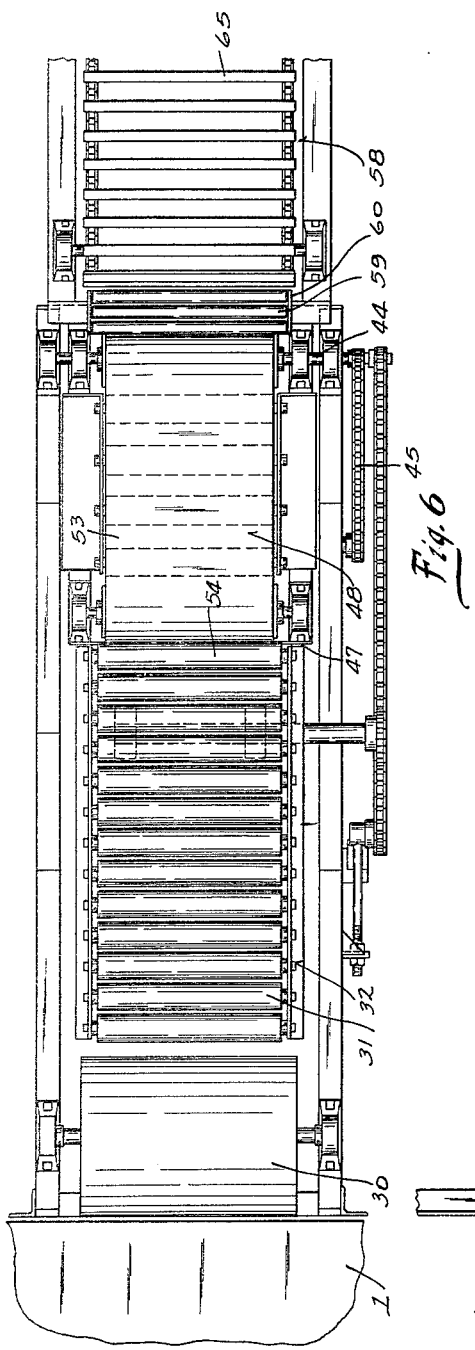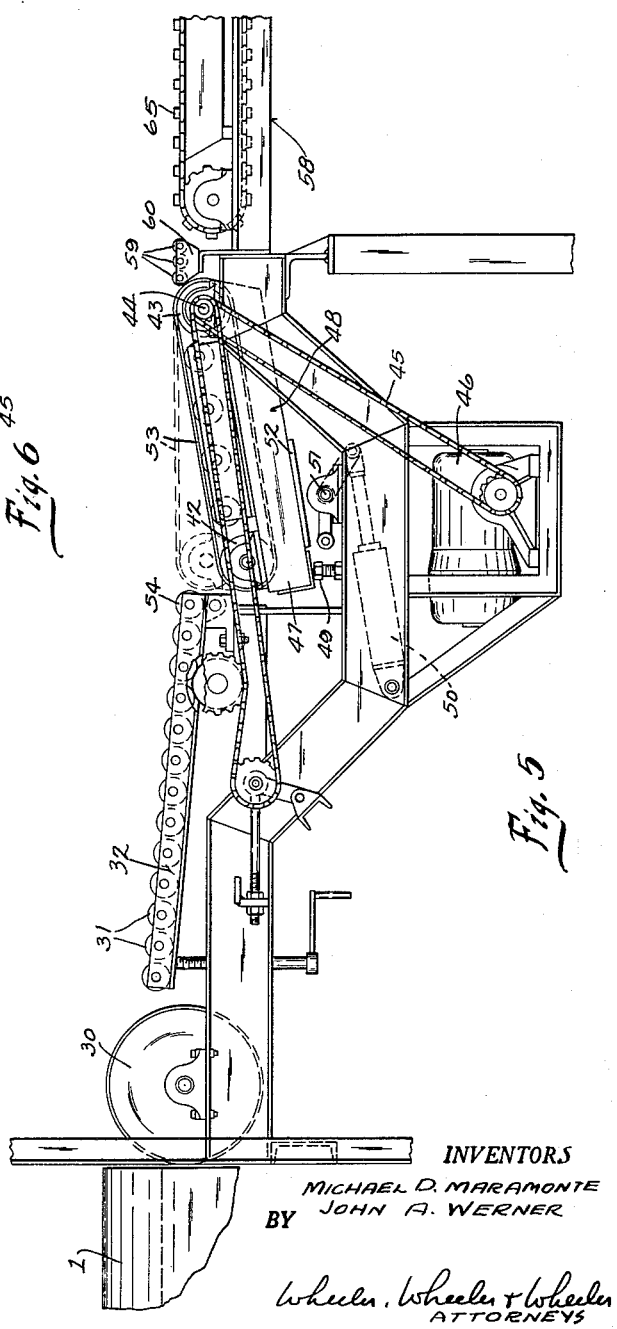

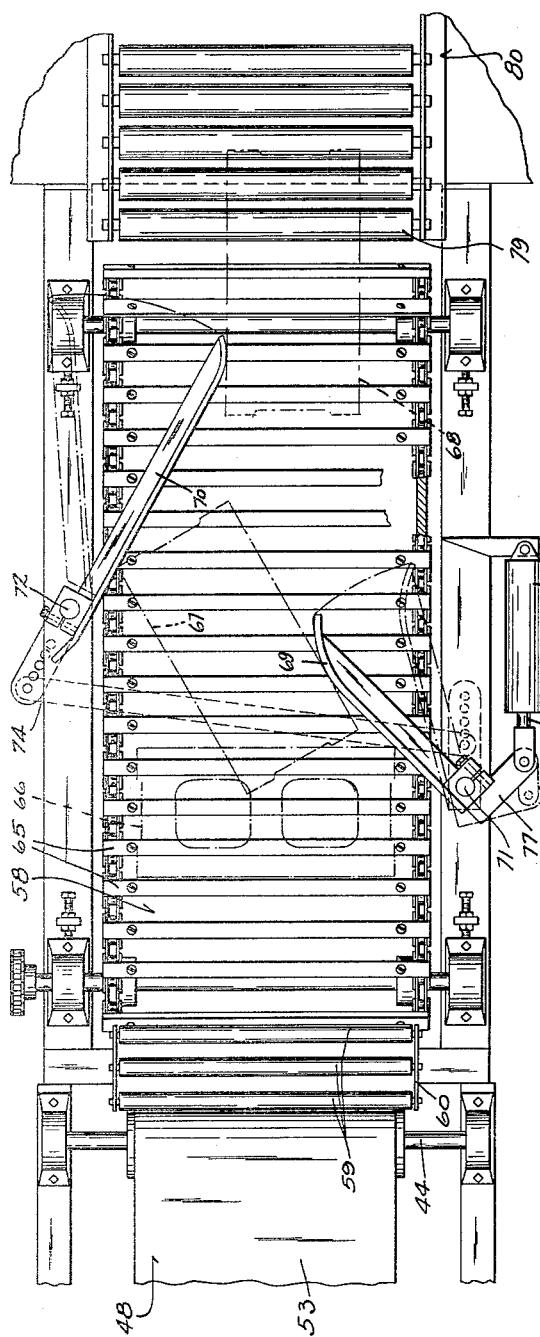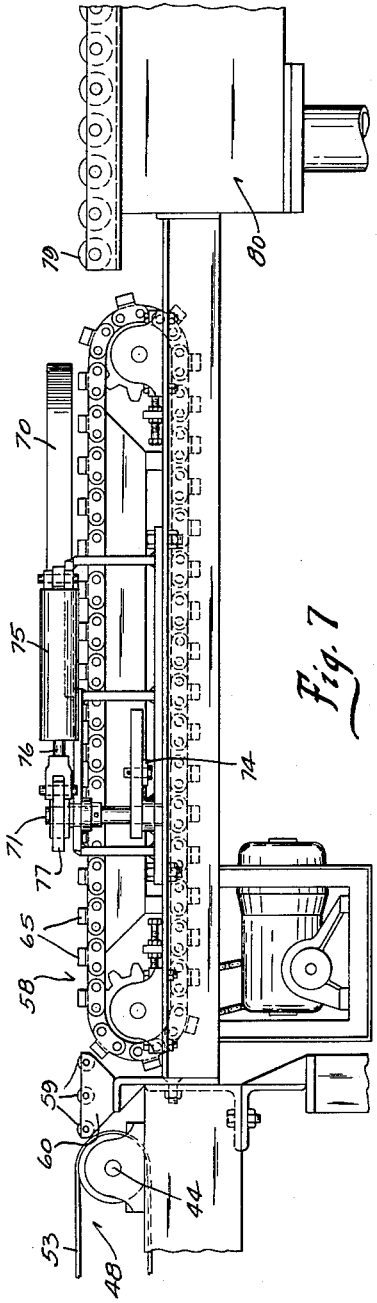

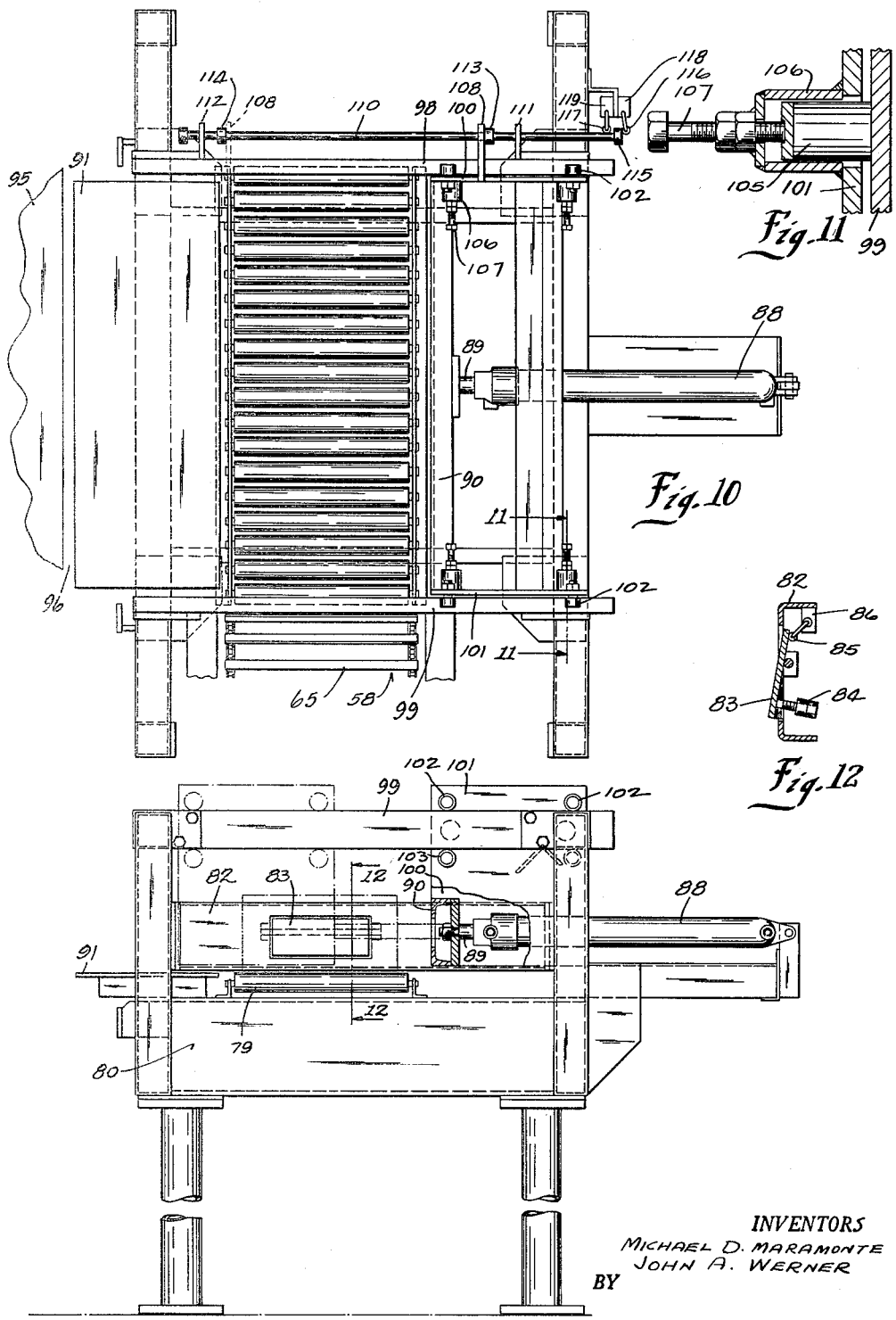

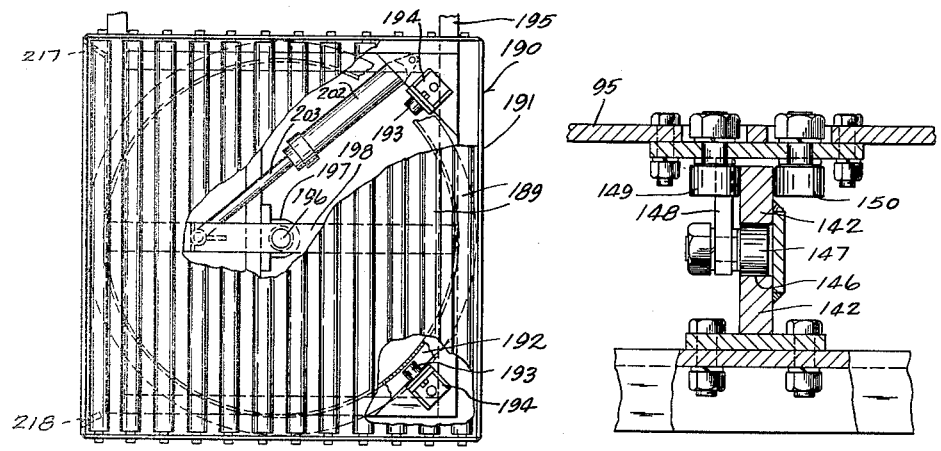
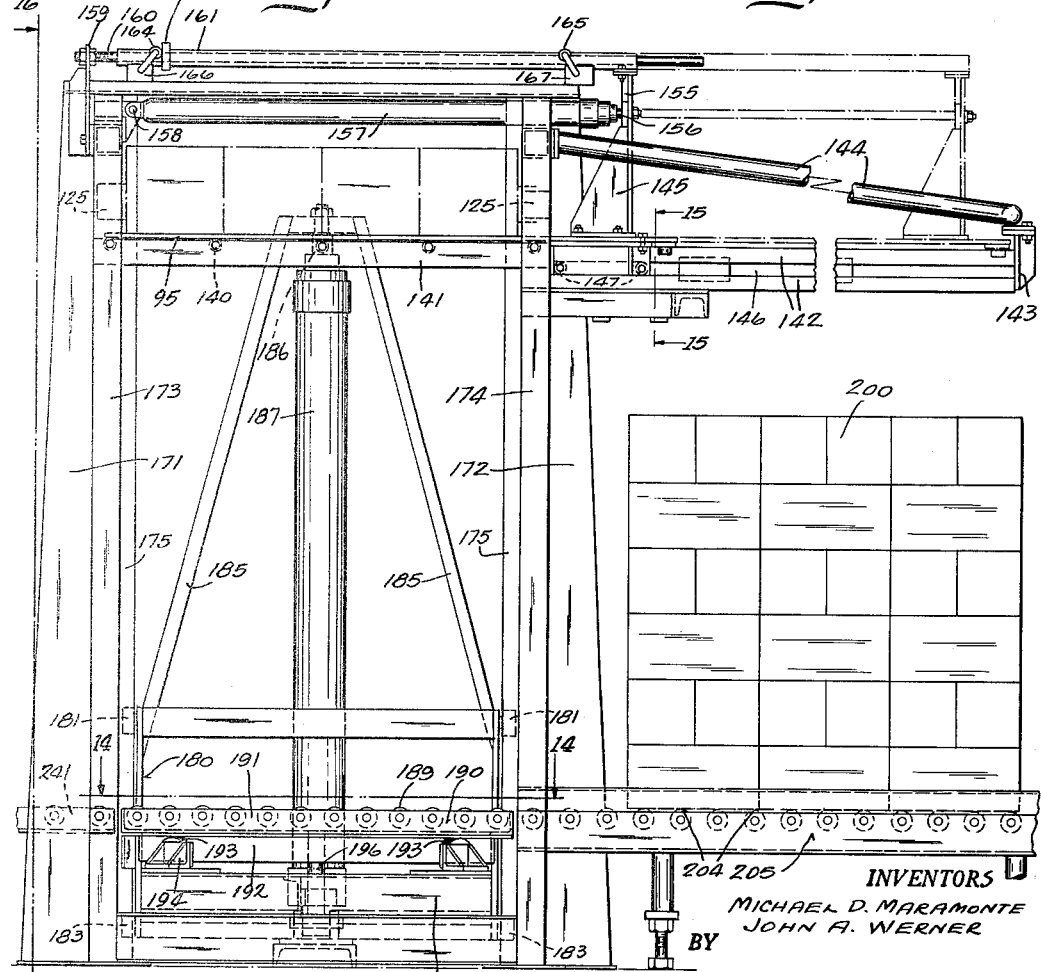

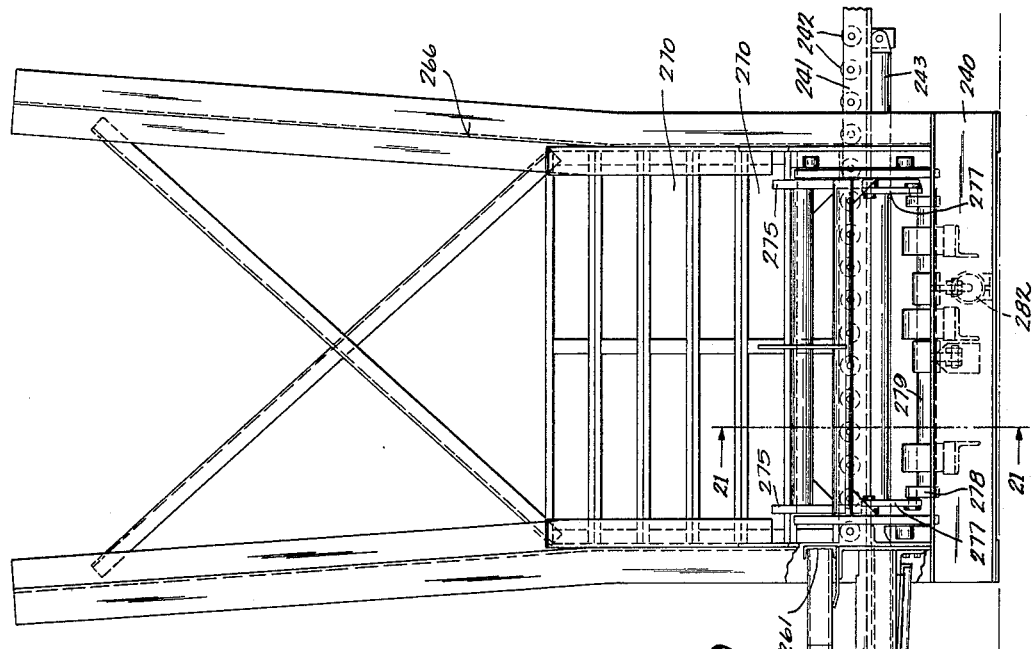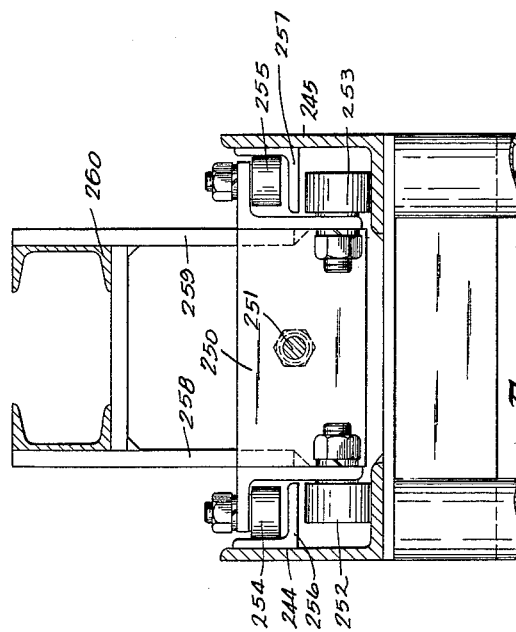

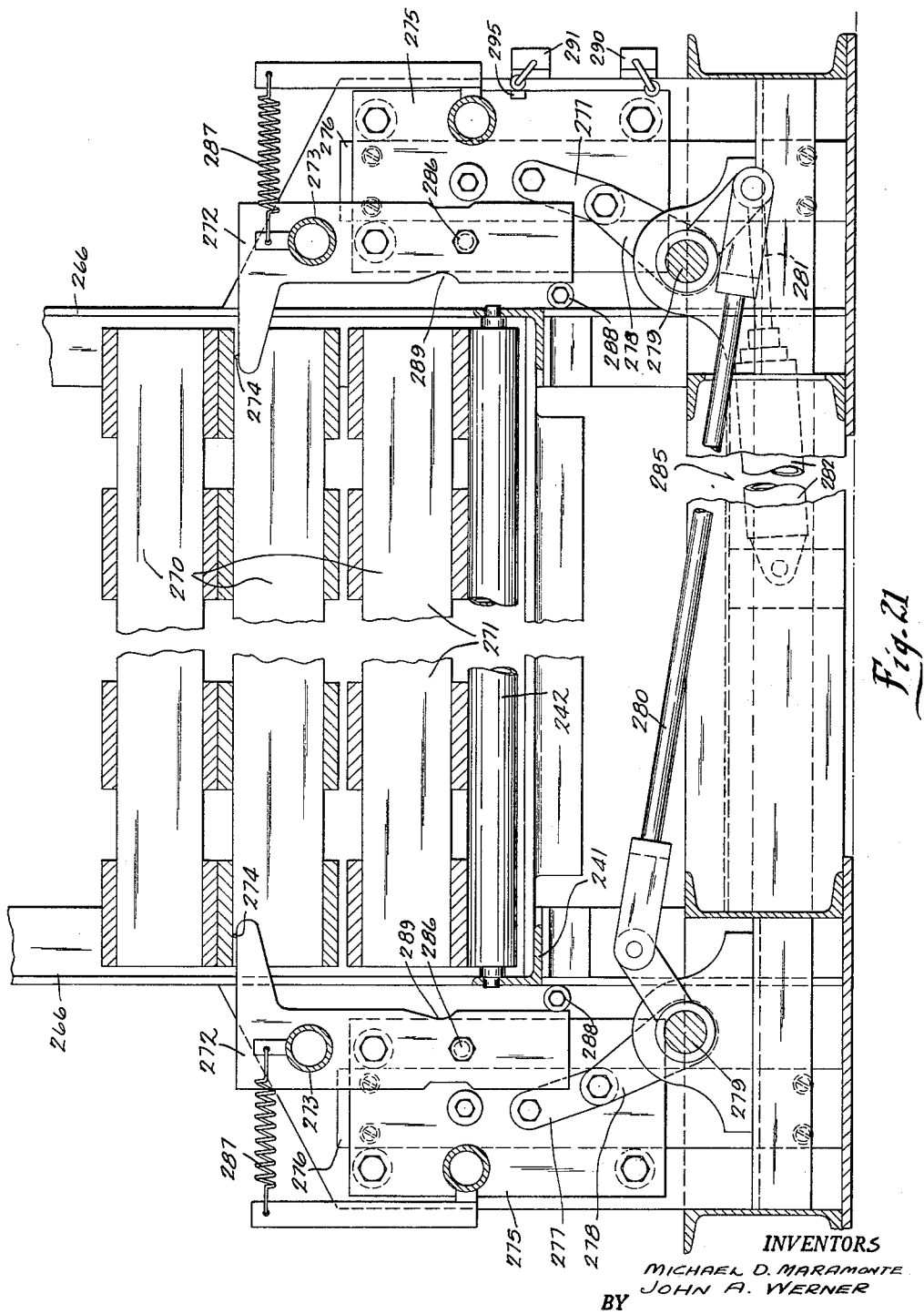

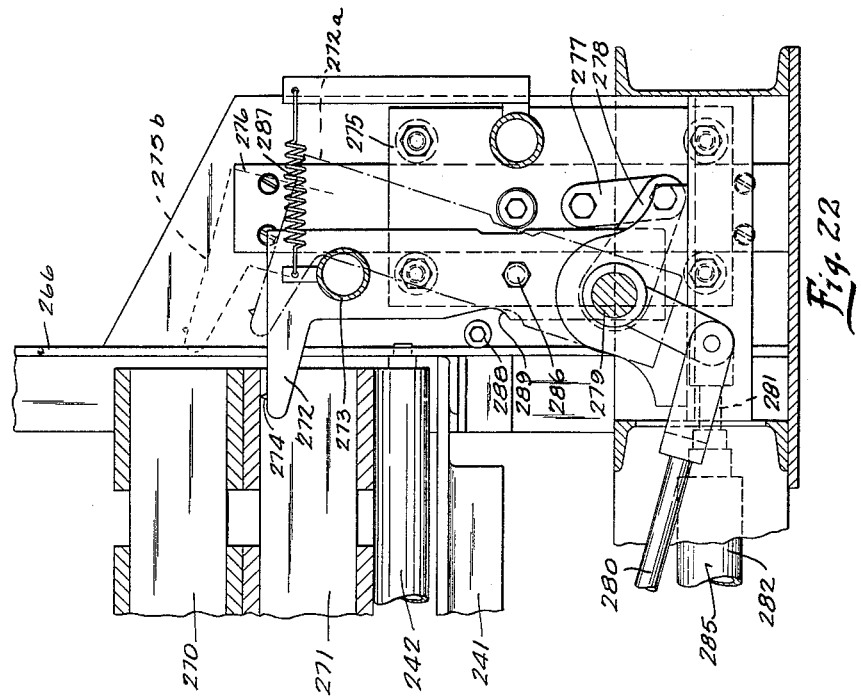

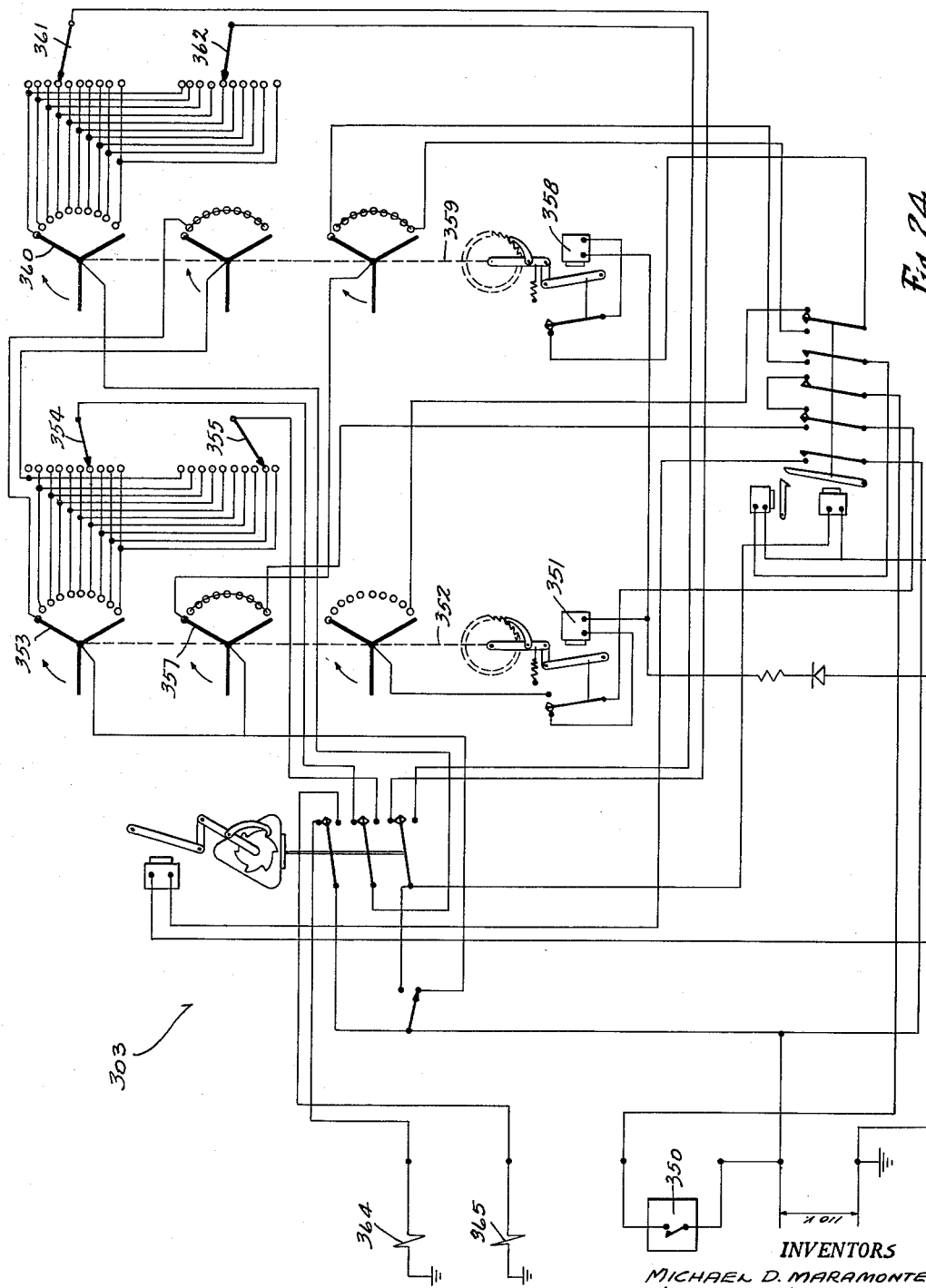

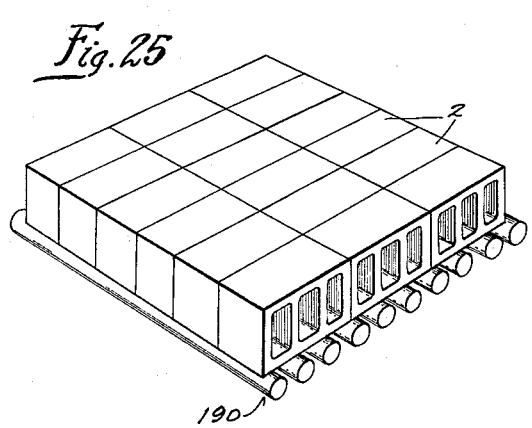
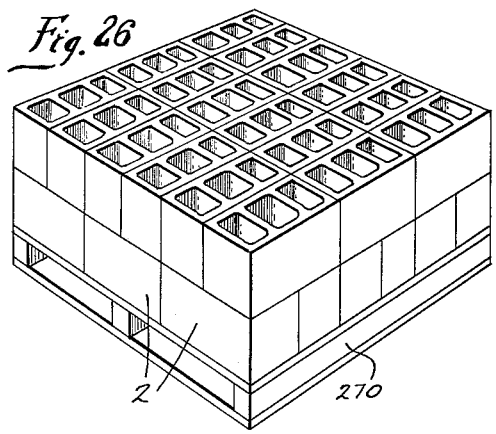
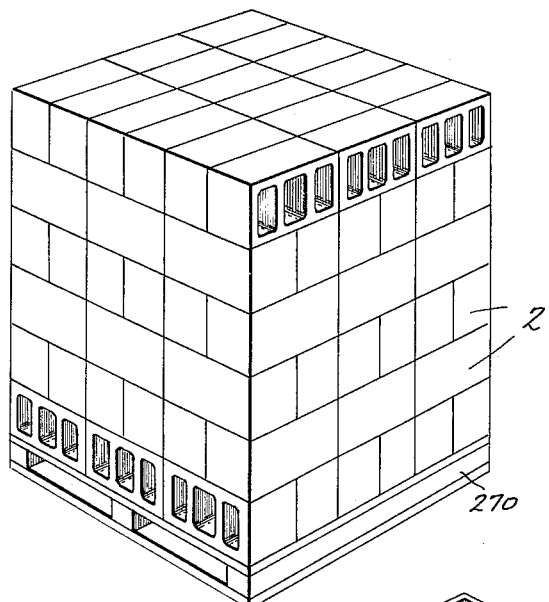
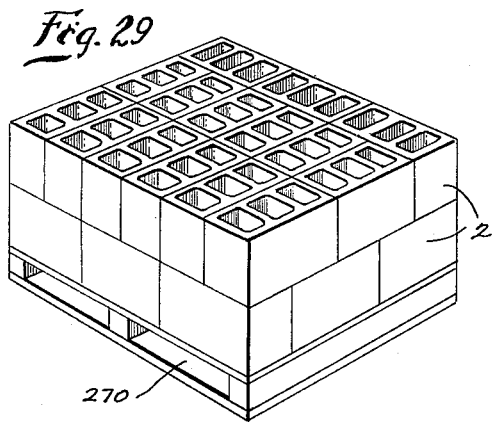
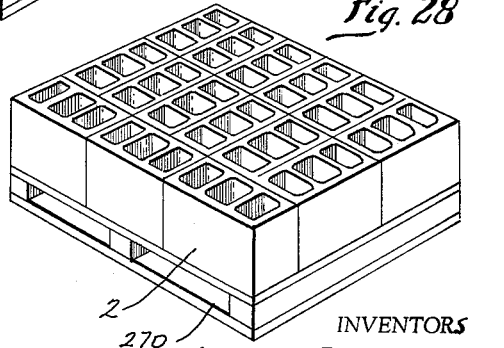

This invention relates to cubing apparatus specifically designed for cubing of concrete blocks but useful for stacking other objects in predetermined orientation in a compact pile. The invention will be described with particular reference to concrete block usage.

The blocks enter the machine on an infeed conveyor. They may be disposed singly or side by side and they may be supported directly on the conveyor or upon pallets. A stop positioned to engage successive blocks may include switch actuating means for arresting movement of the conveyor pending discharge therefrom of the block or blocks engaged with the stop. When the movement of the blocks is arrested, a ram actuates a pusher having overhead support to eject the block or blocks laterally. Preferably the ejected blocks pass immediately over a roller onto a gravity conveyor which is set at a lower level, the arrangement being such that each block, in turn, is rotated 90° about its longitudinal axis to rest on its side with its core openings horizontal.

The gravity conveyor delivers the blocks successively onto a power-driven conveyor which is in two sections, the first of which has a vertically adjustable portion proximate the gravity conveyor to receive successive blocks either at the level of the delivery end of the gravity conveyor or at a lower level. The blocks enter the machine with the small ends of their core openings down. If the blocks pass from the gravity conveyor onto the movable end of the power conveyor at substantially the same horizontal level, the blocks will continue on their sides as they traverse the successive sections of the power conveyor. If the input end of the first section of the powered conveyor is lower than the delivery end of the gravity conveyor, each successive block passing from one to the other will rotate on its longitudinal axis for another 90°. Thus, by vertically adjusting the relative heights of the conveyor section, either manually or by automatic patterned control mechanism, it is possible to orient the successive blocks into positions in which their core openings are either horizontal, as for a base or a snow-cap course, or are vertical with the smaller end of the tapered opening disposed upwardly, this being the position in which most blocks are laid by the mason.

The second section of the powered conveyor includes so-called twist mechanism for rotating successive blocks about a vertical axis from positions in which the greatest length of each block is transverse respecting the conveyor to positions in which the greatest length of each block is longitudinal. The twist mechanism comprises retractable arms which, when retracted, are laterally outside of the path of block movement and which, in their advanced positions, extend obliquely across the conveyor at longitudinally offset points to engage the blocks successively. The first such arm holds back one end of the initially transverse block whereby continued movement of the conveyor beneath the block causes the block to twist on the conveyor. The other is in the path of what is now the forward end of the block and serves to straighten the block on the conveyor.

The purpose of this is to enable the machine to make oblong stacks of the type shown in FIGS. 28 and 29. The control may either be manual or automatic.

At the delivery end of the powered conveyor, successive blocks pass onto the idle rollers of a roller conveyor. Since these rollers are not powered, the block comes to rest until engaged by the next succeeding block delivered onto the roller conveyor. Successive blocks advance on the roller conveyor the blocks previously delivered thereto until, when the roller conveyor is full of blocks from one end to the other, the foremost block in the series encounters a limit switch and stop. The stop arrests further movement of the blocks and the limit switch arrests movement of the powered conveyor to relieve the blocks of further thrust. The roller conveyor serves as a transfer or collecting table on which the blocks which are to form one row of the cube are accumulated.

The limit switch actuated when the transfer table accumulates a complete row of blocks not only precludes further delivery of blocks to the table but activates a transfer ram which ejects all the blocks of the accumulated row laterally from the rollers of the transfer table onto a stripper plate which overlies an elevator hereinafter described. As soon as the transfer ram is retracted, delivery of blocks to the transfer table is resumed and the operation is repeated, the next successive row serving to push ahead of the ram and across the stripper plate the row initially delivered to said plate.

When a sufficient number of rows of blocks have been ejected from the transfer table onto the stripper plate so that the stripper plate is filled with enough blocks to constitute an entire course in the ultimate stack, the blocks in the first row actuate a limit switch having an interlocking control which prevents further operation of the transfer ram and which initiates withdrawal of the stripper plate from beneath the course of blocks resting thereon. Withdrawal of the plate deposits all of the blocks in the said course onto a turntable which constitutes the top surface of an elevator underlying the stripper plate. As soon as the stripper plate is fully withdrawn and the entire course of blocks rests on the elevator (or upon a previously deposited course) a limit switch actuated by movement of the stripper plate causes the lowering of the elevator for a distance approximating the height of the course of blocks which has been freshly deposited thereon. Thereupon the stripper plate returns to receive successive rows of blocks to constitute another course. Meantime, the downward movement of the elevator will have been sufficient so that the turntable on the elevator can automatically be actuated for 90° of rotative movement, assuming that it is desired that the blocks of the next course be oriented at 90° from the positions of the row of blocks last transferred to the elevator. The elevator then returns upwardly, following completion of turntable movement, its ultimate position being such that the uppermost course of blocks on the elevator will lie immediately beneath the stripper plate.

If all the blocks of a given course lie in the same direction, the orientation can be achieved solely by means of the turntable movement above described. If some of the blocks of a given course are to lie in one direction and others transversely of such direction, the turntable will not ordinarily be actuated, the orientation being achieved solely by means of the twist arms above described.

To receive the arms of a fork truck, the blocks of the bottom course of the cube are commonly arranged with their core openings aligned transversely in a horizontal direction. These blocks, therefore, rest on their sides, being left in this position by limiting them to but one 90° rotation instead of inverting them as above described. Similarly, particularly in climates where the block cubes are exposed to snow during storage, the blocks in the top course may be left on their sides to constitute a snow cap so that the snow cannot accumulate in the vertical core holes of the blocks in the intermediate courses.

When the blocks have accumulated on the elevator in a number of courses equal to the desired height of the ultimate cube, the elevator does not stop at the point at which it has theretofore been arrested for the purpose of rotating the turntable. Means is provided for shunting the stop switch and continuing the downward movement of the elevator until it registers with the outfeed conveyor. If the rollers on the turntable conveyor are facing in the wrong direction for delivery by the pusher onto the outfeed conveyor, the elevator will be stopped when contacting the above stop switch and the turntable will be indexed 90° before reaching its bottom position. At this level, an ejecting ram is automatically activated to push the entire cube from the elevator onto the output conveyor. The cube may, at this point, rest on a pallet or the blocks of the course may rest directly on the output conveyor. The rollers on the elevator conveyor are now facing in the wrong direction for receiving the first course of blocks of the cube. As the elevator rises, the turntable will be indexed 90°.

If the cubes are to be handled on pallets, a pallet feeder is provided beside the elevator. At the side thereof opposite the output conveyor an ejecting ram is retracted. An escapement mechanism in the pallet feeder operates to lower the pallets of a stack in the feeder until the lowermost pallet is in front of the ram. The escapement mechanism then lifts the superposed pallets to relieve the bottom pallet of the weight thereof. When pallets are used, the ram acts through this bottom pallet to eject from the elevator the previously loaded pallet. When the ram is retracted, the pallet through which its thrust has been transmitted remains on the elevator and the loaded pallet passes away on the output conveyor. If pallets are not used beneath the cubed blocks, a dummy pallet is attached to the end of the ram to transmit the thrust of the ram to the bottom course of the cube in the same manner as if the cube were supported on a pallet. Thus, no change in the mechanism is necessary to convert from palleted to non-palleted cubing.

In the drawings:

FIG. 1 is a plan view of the apparatus embodying the invention, the input and output conveyor being fragmentarily illustrated.

FIG. 2 is a fragmentary side elevation on an enlarged scale through the input end of the machine, the input conveyor being shown in section.

FIG. 3 is an enlarged detail view in plan of the input end of the machine.

FIG. 4 is a fragmentary detail view in section taken on an enlarged scale on the line 4—4 of FIG. 2.

FIG. 5 is an enlarged fragmentary detailed side elevation on the line 5—5 of FIG. 1.

FIG. 6 is a plan view of the part shown in FIG. 5.

FIG. 7 is an enlarged fragmentary elevation on the line 7—7 of FIG. 1.

FIG. 8 is a plan view of the part shown in FIG. 7.

FIG. 9 is an enlarged view taken in section on the line 9—9 of FIG. 1.

FIG. 10 is a plan view of the structure shown in FIG. 9.

FIG. 11 is a detailed view on a further enlarged scale on the line 11—11 of FIG. 10.

FIG. 12 is a detail view on an enlarged scale taken on line 12—12 of FIG. 9

FIG. 13 is an enlarged detail view taken on the line 13—13 of FIG. 1.

FIG. 14 is a detailed plan view of the elevator shown in FIG. 13, portions being broken away.

FIG. 15 is a fragmentary view taken in section on an enlarged scale on the line 15—15 of FIG. 13.

FIG. 16 is a fragmentary side elevation on the line 16—16 of FIG. 13.

FIG. 17 is a view on an enlarged scale taken in section on the line 17—17 of FIG. 16.

FIG. 18 is a fragmentary detail view taken in section on the line 18—18 of FIG. 16.

FIG. 19 is an enlarged detail view in elevation on the line 19—19 of FIG. 1.

FIG. 20 is a further enlarged fragmentary detail view in transverse section on the line 20—20 of FIG. 19.

FIG. 21 is an enlarged fragmentary detail view in section on the line 21—21 of FIG. 19.

FIG. 22 is a fragmentary detail view similar to FIG. 21 showing the parts in different operative positions.

FIG. 24 is a diagrammatic circuit of an alternate controller using electric counting mechanism.

FIG. 25 is a view in perspective showing a single course of blocks four feet square.

FIG. 26 is a view in perspective showing a second course of blocks oriented with respect to the first course by 90° rotation of the first course preliminary to deposit of the second.

FIG. 27 is a view in perspective showing a complete block cube having the blocks of the bottom course oriented to receive the forks of the fork lift and having the blocks of the top course on their sides to provide a snow cap.

FIG. 28 is a view similar to FIG. 25 showing in perspective an arrangement of blocks on a pallet which is 40 x 48.

FIG. 29 is a view in perspective showing the preferred disposition of the blocks of the second course on the blocks of the first course as shown in FIG. 28.

Figure 23:
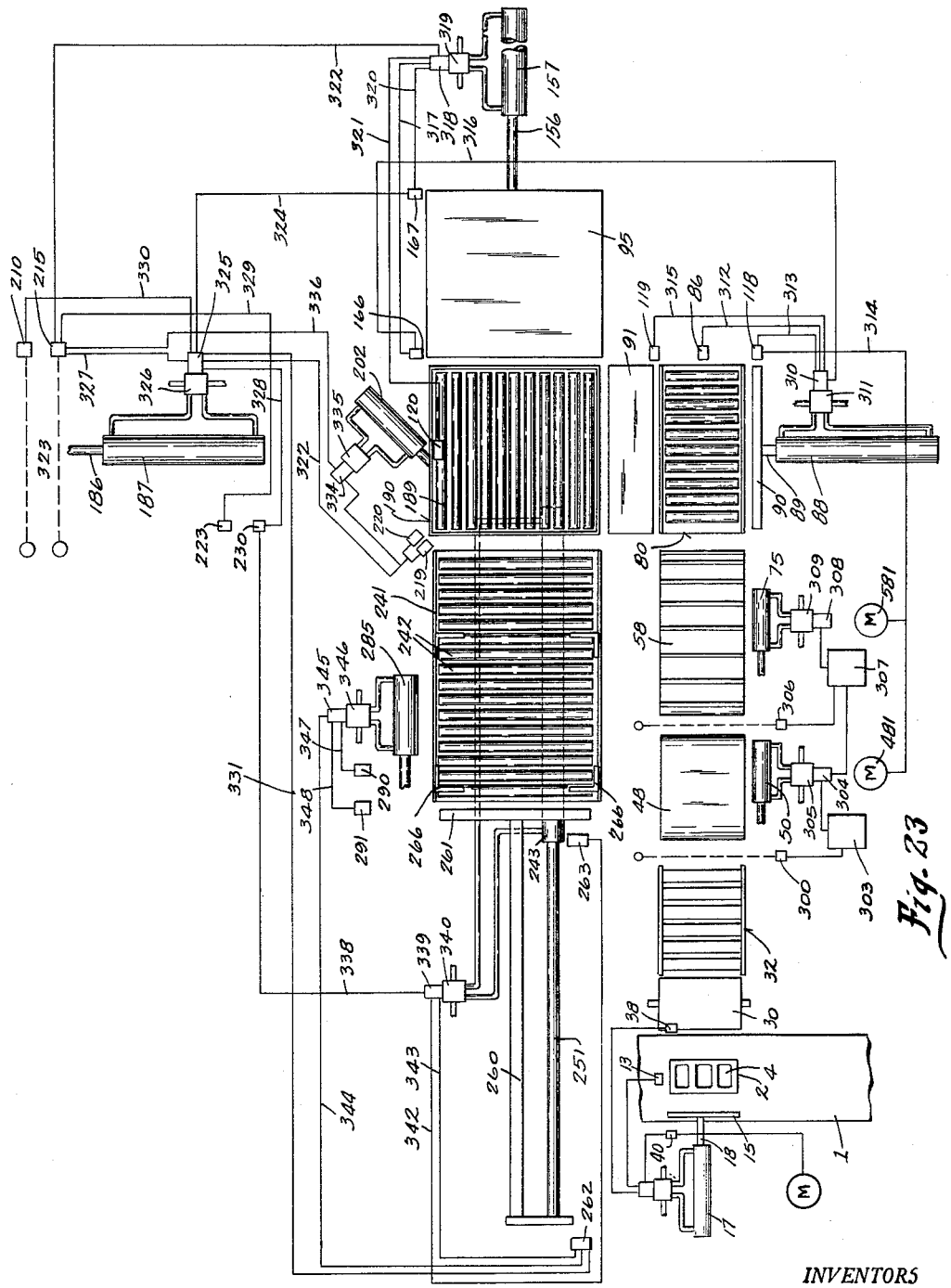
FIG. 23 is a diagram which merely shows operative connections between parts without purporting to show actual connections, the various parts being illustrated in positions mutually offset from, or at different angles with respect to, their actual positions in the apparatus, most of the apparatus being shown in plan and some in elevation.

The infeed conveyor 1 may introduce blocks 2 singly or in groups side by side on a pallet board 3 or directly on the conveyor. As indicated in FIG. 1, the core openings 4 of the blocks are vertical. As they enter the machine, the tapered core openings have their larger ends uppermost, this being the position in which they are ordinarily molded, particularly if cast on a pallet. Most masons prefer to lay the blocks with the smaller ends of the tapered core openings uppermost. Accordingly, provision is made for inverting the blocks in the cubing machine unless otherwise desired.

After elevating the block or blocks as shown in FIG. 2, the conveyor 1 passes beneath the stop bar 6 which is hinged at 7 to the frame 8 and has its free end portion 9 urged outwardly from the frame by compression spring 10. The pallet 3, if any, will pass beneath this bar. Any block or blocks, whether on a pallet or resting directly on the conveyor 1, will engage the bar to displace it in the direction of movement of conveyor 1 as indicated by the arrow in FIGS. 1 and 3. In the course of such movement, the finger 11 of the free end 9 of the stop bar 6 will engage the actuator 12 of limit switch 13 which either directly or through a relay (not shown) controls the operation of conveyor 1. The engagement of finger 11 with actuator 12 immediately arrests movement of the conveyor 1, leaving the advanced block shown at 2' in FIGS. 2 and 23 in the path of a pusher 15.

The frame 8 provides an anchorage at 16 for a ram cylinder 17 provided with a piston 18. At the end of the piston is a cross head 19 connected by arms 20 with a frame 21 which includes plates 22 supporting the pusher 15. The frame 8 includes rails 23, one of which is shown in FIG. 4. The inner faces of these rails are engaged by thrust blocks 24 of nylon or the like adjusted by set screws 25. Rollers 26 and 27 carried by the plate 22 engage the top and bottom margins of the rails 23 to guide the carriage frame 21 for reciprocation as the piston 18 of the double acting ram is reciprocated by fluid admitted to the cylinder 17. The fluid connections are not shown, being well-known for rams.

When the piston 18 moves outwardly, in the ram cylinder 17, the carriage 21 moves from the full line position of FIG. 3 to the dotted line position thereby ejecting the block 2' laterally from the conveyor 1 and across the turning roller 30, whereby the block is turned onto its side on the rollers 31 of the gravity conveyor 32. As shown by dotted lines, the core openings 4 are originally vertical. As the block rests on its side as shown at 2", the core openings are horizontal with the larger end in the lead. An overhead guide 33 adjustable by means of screw 34 has a roller 35 which engages that face of the block which is uppermost, thereby steadying the block in its new position on the gravity conveyor 32. In this position, the block has been rotated 90° about its longitudinal center line from the position in which the block 2' is shown in FIG. 3.

As soon as the pusher has ejected the block over the turning roller 30, its carriage will engage the actuator 37 of limit switch 38 which will reverse the fluid connections to the cylinder 17, causing retraction of the piston 18 to the full line position in which the parts are shown in FIGS. 2 and 3. In this position, the carriage will engage the actuator of switch 40 to arrest the retractive movement of the ram plunger and to re-initiate the operation of conveyor 1 to bring another block or blocks into registry with the pusher. If the pusher acts upon a pair of blocks which are lying side by side on the conveyor as shown in FIG. 1, the blocks will roll over successively in traversing the roller 30 and each will move by gravity along conveyor 32 on the rollers 31 after making a 90° roll.

FIGS. 5 and 6 show at the left the turning roll 30 above described and the gravity conveyor 32 and its rollers 31. Beyond this conveyor are two powered conveyor sections 48 and 58. Conveyor 48 has a pair of pulleys 42 and 43 in a frame which is pivoted on the axis of shaft 44 through which the conveyor is driven by chain 45 from motor 46. The block receiving end 47 of this powered conveyor section 48 is free for vertical movement up and down with respect to an adjustable stop 49. The upward and downward movement is effected by means of a ram 50 acting through a bell crank 51 on a bearing plate 52 on the under side of the conveyor section. In its upper position, the movable end 47 of the conveyor section will carry the conveyor belt 53 substantially at the level of the delivery roll 54 of the gravity conveyor 32, its level being indicated in dotted lines in FIG. 5. When the input end of belt 53 is at the same level as the delivery roll 54 of the gravity conveyor, the blocks will move from one to the other without rotation. If the input end of the powered conveyor belt 53 is depressed as shown in FIG. 5, a block passing over the delivery roll 54 onto the belt 53 will roll another 90°. Since all blocks are rotated at least 90° in passing over roll 30, a second 90° roll, if it occurs, will complete a 180° inversion.

Between the first powered conveyor section 48 and the second powered conveyor section 58, where there might otherwise be a gap, three small idler rolls 59 are mounted on a generally triangular frame 60 as best shown in FIGS. 7 and 8. The second powered conveyor section 58 may use a cleated conveyor chain 65, although this is broadly immaterial. It is on this conveyor section that the twisting of the blocks from transverse to longitudinal positions is effected, if any such change is desired. Fig. 8 shows at 66 in broken lines the initial transverse position of a block which, at 67, is shown partially twisted toward the longitudinal position which it has finally assumed at 68. The twisting arms 69 and 70 are mounted on rock shafts 71 and 72, respectively, the arms being offset longitudinally of conveyor 65 and being movable on their rock shafts between the advanced position shown in full lines and the retracted positions shown in broken lines. A link 74 shown in dotted lines in FIG. 8 connects the two rock shafts with each other for rotation in opposite directions, the rock shaft 71 being primarily actuated. For this purpose, it is preferred to use a ram cylinder 75 having a ram piston 76 connected to the arm 77 of rock shaft 71. It will be apparent that with both arms retracted, the block 66 will move the whole length of the conveyor without being twisted from the position shown at 68. With the arms advanced as shown, the blocks will be twisted on a vertical axis so that they will be aligned longitudinally with the conveyor.

Blocks discharged by the second powered conveyor section are delivered onto rolls 79 on the transfer table 80. These rollers are not power-operated. Consequently, a block delivered onto the table will come to rest until advanced by the thrust of the next delivered block. The blocks successively delivered on the transfer table are accumulated thereon until a complete row of blocks fills the table, at which time the most advanced block in the row will encounter the stop plate 82 separately shown in cross section in FIG. 12. Pivotally mounted in an opening in the stop plate is a pressure plate 83 biased by a weight 84 to hang in the angular position shown in FIG. 12. In that position, the plate engages the actuator 85 to hold open the normally closed switch 86. When the most advanced block in the row accumulated on the transfer table 80, engages the tilted pressure plate to oscillate it into a position in which it is flush with stop plate 82, the plate disengages the switch actuator 85, thus allowing switch 86 to close. This switch is provided with a connection to arrest temporarily the operation of the power-driven conveyor sections 48 and 58 and to supply the ram cylinder 88 with fluid whereby the transfer ram piston 89 is extended to cause the ram head 90 to engage the entire row of blocks on the transfer table and to deliver such blocks laterally of the rollers 79 across the bridge plate 91 onto the stripper plate 95, which overlies the elevator upon which the cube is to be assembled.

For convenience of installation in diverse situations, the various units of this machine are preferably prefabricated for independent mounting. It will be observed in FIGS. 1 to 10 that the transfer table with transfer ram assembly as above described is a unit which has its own separate base and mechanically entirely independent of the conveyor mechanism and the elevator mechanism. The bridge plate 91 substantially closes the gap 96 between the transfer table 80 and the stripper plate 95 of the elevator assembly.

The ram head 90 is provided with overhead support and guidance on rails 98 and 99. At its ends, the head 90 is attached to parallel upright plates 100 and 101 which are disposed adjacent the respective rails and provided with upper and lower rollers as shown in FIG. 9 at 102 and 103, such rollers being engaged with top and bottom margins of the respective rails. In addition, said plates are positioned by bearings 105 engaging the side faces of the respective rails as shown, for example, in FIG. 11. A housing 106 attached to the plate about an opening therein supports the bearing insert or plug 105 which is held by set screw 107 against the face of the adjacent rail. The bearing insert 105 may be metallic or non-metallic, nylon being the material used in practice.

Carried by plate 100 in a position to overhang the rail 98, is an arm 108 which, in ram reciprocation, moves longitudinally of a switch-actuating rod 110 mounted for reciprocation in brackets 111 and 112. In the retracted position of the ram piston 89, the arm 108 on the carriage plate 100 engages collar 113 on the rod 110. In the advanced position, in which plate 100 is shown in broken lines in FIG. 9, the arm 108 will engage the collar 114 on rod 110. Engagement of the arm with either collar will displace the rod axially to cause the collar 115 at the end thereof to engage one or another of the actuators 116 or 117 of the limit switches 118 or 119. In the position in which the parts are illustrated in FIGS. 9 and 10, the collar 115 of rod 110 is held by the ram carriage arm 108 against the actuator 116 of limit switch 118. This switch serves to close the fluid valve (not shown) which controls the retractive movement of piston 89 in ram cylinder 88. The illustrated actuation of switch 118 arrests the retractive movement of the ram head 90 and its carriage plates 100 and 101. Similarly actuation of switch 119 arrests further advance of the ram at the end of its transfer stroke.

When the most advanced block on the transfer table strikes the pressure plate 83 to allow the closing of switch 86 as above described, that switch closes a circuit through switch 119 to admit fluid pressure to ram cylinder 88 to advance piston 89 as already stated. At the end of the stroke of the ram head 90, when the row of blocks on the transfer table has been delivered onto the stripper plate 95, the contact of the arm 108 with collar 114 on the switch control rod 110 disengages collar 115 from the actuator of switch 118, allowing that switch to close while, concurrently, switch 119 is opened to arrest advancing movement of the ram head. The ram head is thereupon returned to the position of FIGS. 9, 10 and 23 and, upon arriving at that position, the switch 118 not only arrests retractive movement of the ram head but reactivates the motors 481 and 581 of the power-driven conveyor sections 48 and 58. Thereupon the operation of assembling another row of blocks on the transfer table proceeds.

Figures 16, 17, 18:
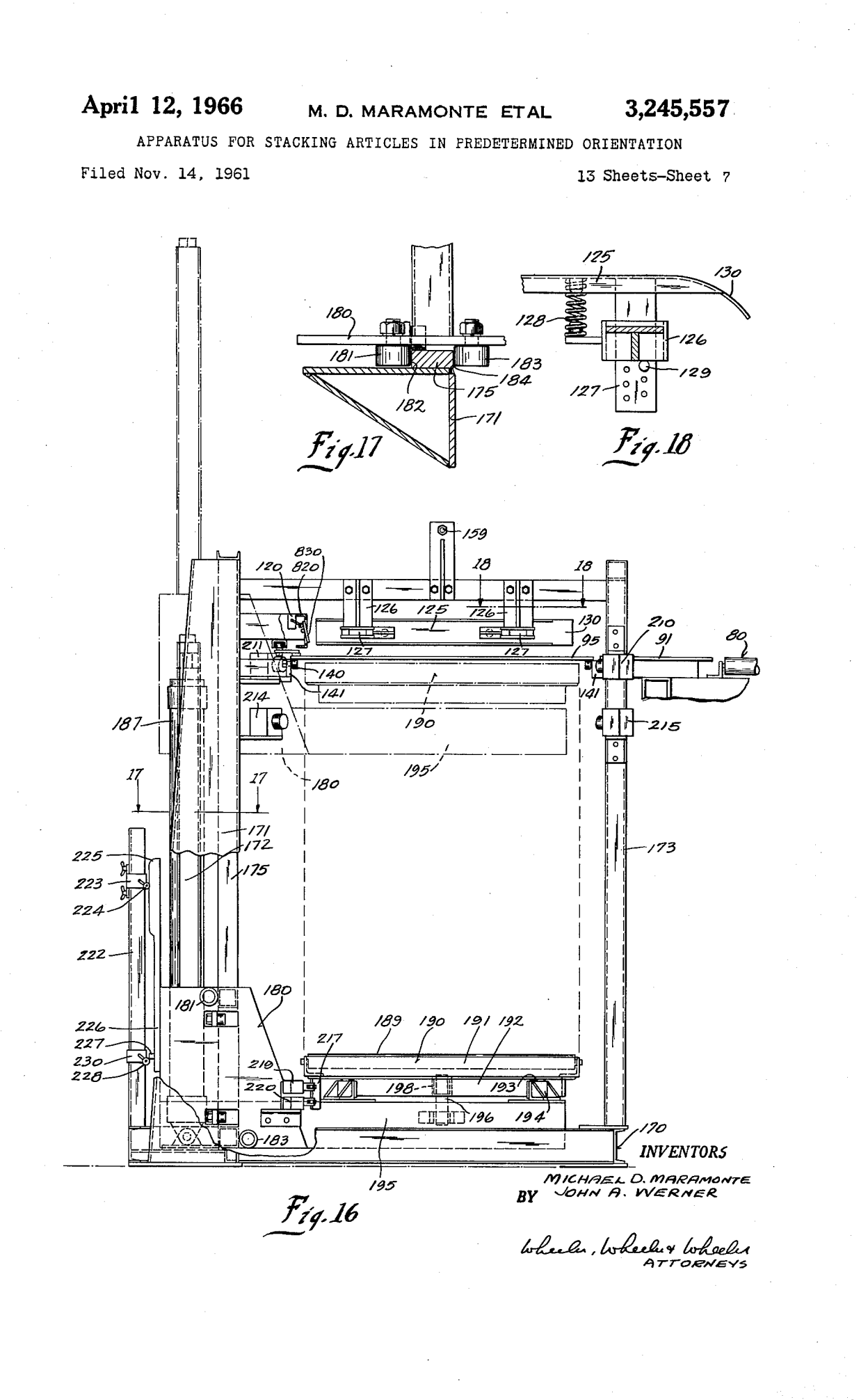

The stroke of the ram head 90 is just sufficient to deliver the row of blocks onto the stripper plate above the edge of the elevator. There the delivered row of blocks awaits the pressure of the next successive delivered row. Successive rows ejected from the transfer table onto the stripper plate advance across the plate those rows which have been previously delivered until the blocks of the first delivered row encounter the stop bar 820 (FIG. 16), this bar being similar to the bar 82, FIG. 12. The pressure of the blocks on the gravity-biased pressure plate 830 displaces that plate to cause the closing of the limit switch 120 which has connections for deactivating the transfer ram so that, when this ram returns to its retracted position, it will deliver no further rows of blocks until the operation of the elevator is completed as presently to be described.

The blocks on the elevator will be in a compact tier, the several rows having been forced together by pressure of the ram head and the several blocks in each row having been forced together by passing between laterally spaced spring-pressed guide rails 125. Brackets 126 provides ways in which the arms 127 supporting the guide rails are reciprocable subject to the bias of compression springs 128. The arms are provided with apertures into which stop pegs 129 are disposed to limit adjustably the approach of the guide rails 125 to each other. Each rail is curved at its receiving end 130 to guide the newly arrived blocks between the rails and to urge them into contact with other blocks in the row under the bias exerted on the rails by the springs 128.

The operation of the switch 120 upon the delivery onto the stripper plate of a sufficient number of blocks to complete a course not only reactivates the transfer ram as above described, but it also initiates withdrawal of the stripper plate from between the blocks of the course, thereby depositing all of the blocks of the course onto whatever surface is provided on the elevator as hereinafter decribed.

The stripper plate 95 is mounted on rollers 140 for movement in a direction transverse with respect to the direction in which the rows of blocks have been delivered to the stripper plate across the bridge plate 91. The rollers 140 are carried on transverse frame members 141 spaced at opposite sides of the elevator. These frame members 141 have extensions 142 which project laterally for a sufficient distance to accommodate the full range of movement of the stripper plate 95, their outboard ends being connected by a cross member 143 and braced from the elevator frame by braces 144. The outboard end of the stripper plate 95 is equipped with a carriage 145 and with anti-friction means for supporting and guiding it for movement along the extensions 142. Each extension is fabricated as best show in FIG. 15 to provide a channel 146 in which operates a roller 147 carried by an arm 148 depending from plate 95. Additional rollers 149 and 150 depending from the plate engage the opposite sides of the respective extensions 142.

The carriage 145 comprises an upwardly extending bracket 155 engaged by a piston 156 of the stripper plate ram. This piston operates in a ram cylinder 157 anchored at 158 to the elevator frame as best shown in FIG. 13. Also anchored to the elevator frame at 159 is a guide rod 160 for a sleeve 161 connected with the bracket 155 of stripper plate 145. This sleeve 161 carries a collar 162 which, in the movement of the stripper plate between the advanced position of FIG. 14 and the retracted position shown in broken lines will alternately engage the actuators 164 and 165 of limit switches 166 and 167 respectively. Engagement of the collar 162 with actuator 164 of limit switch 166 arrests the stripper plate in its operative position above the elevator for reception of a course of rows of blocks, the blocks being shown in broken lines in FIG. 13. When the stripper plate is retracted by the admission of fluid into the double acting ram cylinder 157 in a direction to expel the piston 156 to retract the stripper plate, the final movement of the plate to retracted position as shown in broken lines closes switch 167 to arrest such movement. Momentarily, the stripper plate will dwell in this position until its return is occasioned by the closing of a circuit activated by the downward movement of the elevator to a position where the course of blocks last deposited thereon will clear the path of advance of the stripper plate.

The elevator will now be described.

The elevator frame comprises a base 170 with massive corner posts 171, 172 at the side toward which successive rows of blocks are pushed by the transfer ram to build a course on the stripper plate. The corner posts 173, 174 can be much lighter because the elevator is so designed that the load is cantilevered from a carriage guided by rails 175 on the posts 171, 172. The construction is exemplified in FIG. 17. The corner post 171 there illustrated is made triangular in horizontal section with the rails 175 disposed vertically. The elevator carriage 180 has roller 181 at a high level engaging the outside margin 182 of rail 175 while roller 183 at a lower level engages the inner margin 184 of the rail. The structure is duplicated at the opposite side of the elevator frame.

The yoke 185 of carriage 180 connects to the piston 186 of the elevator ram. The elevator ram cylinder 187 stands erect between frame members 171 and 172. When piston 186 is extended, it projects to a height indicated in broken lines in FIG. 16. As there shown, it has elevated the carriage 180 along the track provided by the vertical rails 175 to a level such that the block-receiving surface is disposed immediately beneath the stripper plate 95.

The block-receiving surface of the elevator may constitute the rollers 189 on the turntable 190 or it may constitute a pallet supported on said rollers as hereinafter described. In FIG. 13, the finished cube shown at 200 has been assembled directly upon the rollers 189 of the turntable.

The turntable 190 comprises a frame 191 in which the rollers 189 are mounted. The frame 191 is carried by a ring 192 rotatably mounted on rollers 193 carried by brackets 194 from the cantilevered subframe 195 which projects laterally from the carriage 180. While the weight of the turntable is carried through the ring 192 from rollers 193, the turntable is desirably maintained centered by means of a central pin 196 carried by the cantilevered subframe and engaged in a bearing 197 connected with the ring 192 by a cross arm 198.

In the preferred arrangement shown, the turntable does not have full rotation but oscillates 90° forth and back. The turntable ram comprises a cylinder 202 which is fast to subframe 195 and has a piston 203 connected with cross member 198 of turntable ring 182, as shown in FIG. 14. As illustrated, the piston has been extended to move the turntable to a position in which rollers 189 are oriented for delivery from blocks onto output conveyor 205. Output conveyor 205 may have rollers 204 but the nature of this conveyor is not important.

If it is desired to palletize the cube 200, the pallet will rest on the rollers 189. The only difference in operation would be that the elevator would maintain the turntable at a slightly lower level to allow for the height of the pallet. Without the pallet, the rollers 189 of the turntable will lie immediately beneath the stripper plate 95 when the stripper plate is withdrawn. It is shown in broken lines in this position in FIG. 16. It is unnecessary to make any manual adjustment to compensate for the presence or lack of a pallet on the turntable because the upper limit of elevator movement is determined by an electric eye 210 which is activated by a light beam from the light source 211 unless or until the light beam is intercepted by the turntable 190 of a pallet thereon or one or more course of blocks on the pallet. In any such event, the deactivation of the electric eye 210 arrests further upward movement of the elevator by shutting off the flow of fluid to its ram cylinder 187.

As has already been noted, the limit switch 167 which is closed by the full retraction of the stripper plate 95 beneath the course of blocks will, after the blocks of said course have been deposited on the elevator (or on a preceding course) initiate the downward movement of the elevator carriage sufficiently to clear a second light beam from the light source 214 which will thereupon activate electric eye 215 to arrest further downward movement of the elevator except under circumstances hereinafter mentioned.

When the electric eye 215 responds to the lower light beam, the downward movement of the elevator stops and a circuit is completed through the switches and solenoid valves which control movement of fluid into the turntable cylinder 202. Thereupon, unless the turntable is deactivated for the purposes of the particular cubing operation, the light beam reaching the electric eye 215 results in turntable rotation for 90°.

At the corners of the turntable are depending fingers 217, 218. In each extreme position of 90° oscillation of the turntable, one or another of the actuators engages one of the limit switches 219, 220 to arrest further turntable oscillation and to initiate downward movement of the elevator until the uppermost course of the blocks thereon intercepts the beam which normally activates the electric eye 210. Interruption of light to the electric eye 210 will stop the elevator with the top course of blocks directly beneath the stripper plate 95 in readiness to receive the next course as already described.

When the cube is completed on the elevator, the operation is somewhat different. On the post 222 shown at the left in FIG. 16, there is an adjustably mounted upper limit switch at 223 having an actuator 224 in a position to be engaged by a cam 225 mounted on the carriage 180 of the elevator. At a lower level, the arm 226 which carries the cam 225 is provided with a pin 227 projecting to engage an actuator 228 of limit switch 230. The connections of limit switches 223 and 230 are such that whenever the elevator is at a level sufficiently low so that the cam 225 engages the actuator 224 of switch 223, such switch shunts the control normally effected by the electric eye 215. Under such circumstances, the valve which regulates fluid flow to and from the elevator ram cylinder 187 remains in lowering position so that the elevator continues downward movement instead of reversing as above described. Such movement continues until the elevator reaches a position in which the turntable rollers 189 are flush with the rollers 204 of the discharge conveyor 205 as shown in FIG. 13. At that level, the pin 227 operates switch 230 to terminate downward movement of the elevator and to hold it in line with the discharge conveyor.

At the same time, the circuit controlling the turntable ram 202, 203 is closed if it is necessary to rotate the turntable and the cubed blocks thereon to place the turntable rollers parallel to the roller discharge conveyor. Sometimes the turntable will already be in this position. If not, it is automatically adjusted through the circuits controlled by switch 330. The finished cube is thereupon ejected from the turntable onto the discharge conveyor. If the cube has been formed on a pallet, the pallet is ejected with the cube upon it; otherwise, the ejecting means now to be described operates directly on the lowermost course of blocks in the cube 200.

The ejection means comprises a separate unit as shown in FIGURE 19. As above noted, it is one of the features of the present invention that the various components are prefabricated separately so that they may be associated in various relative positions.

As shown, the ejection unit includes a pallet hopper 266 but this is optional. There is a base at 240 carrying a short length of roller conveyor frame 241 equipped with rollers 242 like those on the turntable and the discharge conveyor 205. Mounted on the under side of the conveyor frame 241 where the frame projects slightly beyond the base is the ejector ram cylinder 243. At the other side of base 240 are angle iron rails 244, 245 which provide ways for carriage 250 to which the ejector ram piston 251 is centrally connected. The rollers 252 and 253 support the carriage on the rails 244 and 245 respectively, while the rollers 254, 255 receive lateral guidance from the inverted guide angles 256 and 257. Arms 258 and 259 projecting upwardly from the carriage 250 support the thrust members 260 as shown in FIGS. 19 and 20. These thrust members have a cross head 261 reciprocable along the conveyor rollers 242 to advance a pallet 270 toward and across the elevator to drive ahead of it the cube 200 which has been assembled on the elevator, whether or not such cube is on a pallet. The cube will be propelled only to the edge of the turntable on the elevator. If the cube is on a pallet, the pallet will just clear the elevator. Consequently, when the thrust member 260 is returned toward the retracted position in which it is illustrated in FIG. 19, the pallet directly engaged by the cross head 261 will remain on the elevator, the cross head being withdrawn for the full width of frame 240 so that another pallet 270 may either be deposited mechanically in the path by the mechanism presently to be described or can be placed manually in its path. The stroke of the pusher 260 is regulated by limit switches 262, 263 (FIGS. 19 and 23).

If the cube was not assembled on a pallet, and the next cube is likewise to be assembled directly on the turntable without a pallet, a dummy pallet will be lashed to cross head 261 so that the device will function exactly as above described except that the retraction of the thrust member 260 will likewise retract the dummy pallet, leaving the turntable open.

When pallets 270 are to be supplied mechanically, this is conveniently done by the pallet feeder as shown in FIGS. 19, 21 and 22. FIGS. 21 and 22 show the operation of an escapement mechanism which supports the weight of the pallets in hopper 266 which are above the lowermost pallet 271 which is to be ejected.

Pairs of pallet-supporting dogs 272 connected to bars 273 are provided at opposite sides of the hopper 266. Each dog has a pin 274 for engagement with the under surface of the top of the pallet with which it registers.

FIG. 21 shows the dogs operatively engaged in supporting relationship to the lowermost pallet in the stack above the pallet 271, the stack being slightly elevated above pallet 271 to relieve it of pressure.

The several dogs 272 are mounted on plates 275 which are guided for vertical reciprocation on ways 276. For raising and lowering the plates they are connected by links 277 with the rocker arms 278 of rock shafts 279 which are cross-connected by link 280. The rock shaft at the right in FIG. 21 is directly actuated by the plunger 281 of cylinder 282 of the ram generically designated by reference character 285. Thus the ram operates the two rock shafts simultaneously to produce corresponding movement of the plates 275 upon which the dogs 272 are mounted.

The dogs 272 are pivoted by means of bolts 286 to the respective plates. They are subject to the bias of tension springs 287 which tend to retract them from engagement with the pallets. In the position of the parts shown in FIG. 21, the dogs are held erect by engagement of their lower end portions with camming rollers 288. When the plates 275 are lowered to a position such that the cam notch 289 of the respective dog registers with the roller 288, the roller is permitted to oscillate about its pivotal support 286 subject to the bias of spring 287, whereby the dog may be withdrawn from the pallet when relieved of load.

The stroke of the ram 285 is determined by the limit switches 290 and 291. After the lowermost pallet 271 has been ejected from beneath the stack, the plates 272 are moved downwardly by the retraction of the ram piston 281 in the cylinder 282. The dogs will become free to oscillate about their respective pivots 286 so far as the camming rollers 288 are concerned. However, the engagement of pins 274 with the supported pallets will preclude any withdrawal of the dogs under bias of spring 287 and the stack of pallets will therefore be lowered with the plates, the dogs remaining erect in the position illustrated in FIG. 21.

When the pallet supported by the dogs engages the rollers 242 at the bottom of the hopper, the slight continuing movement of plates 276 and dogs 272 will disengage the pins 274 from the lowermost pallet in the stack. FIG. 22 shows in full lines the positions of the parts at the moment of disengagement. Fingers 295 on the spring bracket is about to engage the lower limit switch 290 to arrest further downward movement of the plate 275. Before it does so, the pins will have disengaged from the lowermost pallet and the dogs will thereby have been released to oscillate under the bias of springs 287 to the position shown in broken lines at 272a. In this position, the dogs will clear the pallets so that when the stroke of ram 285 is reversed to elevate the slide plates 275, the dogs will move up in the positions indicated at 275b, from which positions they can re-enter beneath the next pallet when the lower ends of the respective dogs are engaged by the cam rollers 288. The upward movement will continue to the position shown in FIG. 21, in which position the finger 295 is engaged with the upper limit switch 291 and the stack of pallets above that which rests on rollers 242 is elevated slightly to facilitate ejection of the pallet on the rollers as above described.

FIG. 23 shows merely diagrammatically the electrical connections which correlate the functioning of the parts as above described. For automatically operating the ram 50 to raise and lower the block-inverting conveyor 48 as above described, an electric eye at 300 provides impulses for the operation of the counter 303 (for which programming tape may be substituted) to control the up coil and the down coil of the solenoid 304 which controls the valve 305 of the ram 50. If all blocks are to be inverted, this counter will not be used and the input end of conveyor 48 will remain in its lowered position. If the counter is used, it will cause inversion of the requisite number of blocks, leaving on their sides, the number required for the fork lift course and for the snow cap.

Similarly the electric eye 306 feeds impulses into a counter 305 (for which a programming tape may be substituted) for controlling the up coil and down coil of solenoid 308 which controls the valve 309 of the ram 75 which operates the twist mechanism to shift blocks from transverse to longitudinally aligned position when so desired. For square stacks, this will not ordinarily be used, the turntable producing the desired alternating orientation of the blocks of successive courses. Both counters and programming tape assemblies are known per se. Also, it is of course understood that the orientation of the blocks by tilting or twisting on the conveyors 48, 58 may be done manually if desired, simply by manipulating the necessary switches by hand. Hence the present application will be limited to a brief description hereinafter of the simple counter diagram shown in FIG. 24.

In FIG. 23, the general organization is diagrammed in simplified form. The limit switch 86 is connected by conductor 312 to the solenoid 310 of valve 311 of ram cylinder 88. The limit switch 118 connects to the same solenoid by conductor 313 and connects by conductor 314 to the motors 481, 581 to control their functions as above described.

Limit switch 119 is connected by conductor 315 to the same solenoid 310. Cross connection to such solenoid is also provided by conductor 316 from limit switch 166. The limit switch 166 has a further connection 317 to the solenoid 318 which controls the valve 319 of ram cylinder 157. Another connection of solenoid 318 is provided by conductor 320 from limit switch 167 and still another connection is provided by conductor 321 from limit switch 120. A fourth connection is provided by conductor 322 from electric eye 215. A beam 323 directed toward electric eye 215 is intercepted by blocks assembled on the table as above described.

Limit switch 167 is connected by conductor 324 with the solenoid 325 which controls the valve 326 of the table elevating ram 187. This solenoid also has a connection by conductor 327 from the electric eye 215. The solenoid 325 is also connected by conductor 328 with limit switch 230 actuated by the table and with limit switch 223 operated at the top of the table stroke and connected by conductor 329 to the electric eye 215. Solenoid 325 has a further connection 330 with electric eye 210 and a connection 331 with limit switch 262 and connection 332 with limit switches 219 and 220. These latter limit switches are connected with a solenoid 334 which controls the valve 335 for ram cylinder 202, solenoid 334 also being connected by conductor 336 with electric eye 215.

The limit switch 230 is connected by conductor 338 with solenoid 339 of valve 340 of the ram cylinder 243. The solenoid 339 is also connected by conductors 342, 343 with limit switches 262 and 263, respectively. Switch 262 in turn has an electrical connection at 344 to the solenoid 345 which controls the valve 346 of ram 285. Solenoid 345 is also connected by conductors 347 and 348 with limit switches 290 and 291 which regulate movement of the pallet hopper escapement.

No attempt has been made to illustrate the more complex wiring diagram actually employed, it being within the skill of the art to wire these electrical components in the light of the desired operation above described. As diagrammed, the arrangement is such that completion of each operation initiates the next in continuous succession.

When a row of blocks is assembled on the accumulator table, the feed stops and the row is pushed onto the stripper plate, whereupon a new row is accumulated. When a complete course is assembled on the stripper plate, the plate is retracted to deposit the course on the turntable; the elevator is lowered to clear the plate; the plate returns to receive another row; the turntable indexes and the elevator is raised until the indexed course on the turntable is immediately beneath the plate to receive another course when the plate is next withdrawn from a new course assembled thereon.

When a predetermined number of courses have thus been assembled in alternating orientation, the stack will be complete and automatically the elevator will go to its discharge position because it has reached a level from which it does not automatically index and return before unloaded. Thereupon the ejecting ram functions through an intervening pallet to push the completed stack from the elevator. The intervening pallet may be placed by hand, or fed from the hopper, or, if no pallet is being used beneath the cubes or stacks, a pallet or other spacer may be lashed to the ejection ram plunger to transmit motion to the lowest course of the stack.

In any event, ejection is followed automatically by the return of the ejection ram; the upward movement of the elevator to its elevated position beneath the stripper plate (bearing the new pallet, if any, upon its turntable); and the lowering of a new pallet in the hopper and relief of pressure thereon for future delivery.

In all these operations, the limit switch or electric eye which signals completion of one operation not only restores the parts involved but initiates the next operation.

FIG. 25 shows a single course of blocks in a square pattern without a pallet. These blocks are positioned on their sides directly on the rollers of the elevator table with their openings aligned to receive the fingers of the fork lift. Any desired cube may be erected on such a course. The blocks are delivered in this position by adjusting the conveyor section 48 to the level of conveyor 32 so that there will be no final rollover, thus leaving the blocks on their sides.

FIG. 26 shows the more normal assembly of two courses of blocks on the pallet 270 with the blocks so oriented that on successive courses they alternate in direction. This result is achieved by having full rollover and by indexing the elevator table 90 degrees following the deposit of each course as above described. Both in FIG. 25 and FIG. 26, the blocks illustrated happen to be 16 x 8 x 8 blocks, making a course which is 48 inches square.

FIG. 27 shows a cube assembled on a pallet 270 with all intermediate courses alternating between longitudinal and transverse positions for interlock, the blocks of the top course being turned on their sides to provide a snowcap as described above.

FIG. 28 shows an arrangement in which it is possible to produce a stack which is oblong, the dimensions selected for illustration being 40" x 48". This involves having two rows of six blocks each in one direction and one row of three blocks in the opposite direction of orientation. FIG. 29 shows how the blocks of the next course are arranged so that some of the longitudinally oriented blocks lap the transversely oriented blocks and vice versa.

These varied arrangements are readily possible through the use of counting mechanisms at 303 and 307 to determine how many blocks should be left in one position and how many in another. The counting mechanism for determining whether the blocks are to remain on their sides or to be turned completely over is the simpler of the two and will be described by way of example, although such counting mechanisms are well-known. Reference is made to FIG. 24.

In the circuit shown in FIG. 24 by way of exemplifying the counter 303, impulse switch 350 is either the electric eye 300 or a relay operated by the electric eye. As each block passes the electric eye, it intercepts a beam of light and thereby delivers impulses to the solenoid 351 of a stepping relay which rotates the shaft 352 to move the unit counting switch arm 353 over successive contacts, from which current may be taken as desired by the adjustable contacts 354, 355.

A parallel contactor 357 controls a circuit which energizes another stepping relay coil 358 for advancing the tens counting shaft 359 whose contactor 360 operates over a series of fixed contacts from which current may be taken as desired by the adjustable contactors 361, 362. When the total desired number of impulses (representing the number of blocks which have passed the energizing beam of the electric eye) has been counted past the electric eye, energy is delivered into the raising coil 364 or the lowering coil 365 of the solenoid 304 which controls the valve 305 of ram 50. Thus, by properly setting the apparatus for the desired operation, it is possible to cause any given number of blocks to turn completely over and a subsequent controlled number of blocks to remain on their sides, the operation then repeating itself.

The counter for controlling the operation of the block twisting mechanism tends to be somewhat more complex due to the requirements of making up a course such as those shown in FIGS. 28 and 29. However, the principle is identical. Also, for any special application, known types of programming tape mechanisms may be substituted for the counters. These operate quite differently but are likewise capable of controlling automatic disposition of the blocks in the desired courses.

I claim:

1. A concrete block cubing apparatus comprising the combination with a rollover infeed means for turning incoming blocks onto their sides, a receiving conveyor adapted to receive blocks from said means and having means for selectively adjusting its height respecting said means, whereby blocks received may remain on their sides or may be rolled over for another 90 degrees according to the position of the receiving conveyor, an accumulator for such blocks as are delivered from the receiving conveyor, limit switch means engaged by the first block of a row assembled on the accumulating conveyor when the row is complete, an elevator provided with an indexing turntable, a slide upon which a course of blocks can be assembled above the turntable, means for transferring to the slide rows of blocks accumulated on the accumulating conveyor, means for withdrawing the slide when a course is complete to deposit the weight thereof on the elevator, means for lowering the elevator and restoring the slide to receieve another course of blocks and thereupon repeating assembly of a new course on the slide, and means whereby an assembled stack of blocks is discharged from the elevator automatically when the elevator is lowered to a position representing the deposit of a predetermined succession of courses thereon, and means for automatically interlocking the successive operations of said means for automatic repetition.

2. Means for stacking objects in courses and comprising the combination with an accumulator and a laterally adjacent elevator, of means for delivering objects into rows on the accumulator, said object delivering means including a plurality of turnover means for selective successive operation upon objects in the course of their delivery means for displacing successive rows of objects laterally over the elevator, a receiving plate upon which the objects are delivered over the elevator, means for rotatably indexing the elevator, means for withdrawing the plate from beneath the objects thereon to lower such objects for support from the elevator, and overhead means for reciprocably actuating the plate for movement to and from registry with the elevator.

References Cited by the Examiner

UNITED STATES PATENTS

| 1,738,211 | 12/1929 | Schaub | 187—1 |
| 2,612,981 | 10/1952 | Alden | 198—21 |
| 2,633,971 | 4/1953 | Albertoli et al. | 189—33.4 |

(Other references on following page)

UNITED STATES PATENTS

| | | | |
|---|---|---|---|
| 2,675,928 | 4/1954 | Slater. | |
| 2,681,130 | 6/1954 | Atwood | 198—21 |
| 2,701,650 | 2/1955 | Stevenson. | |
| 2,815,846 | 12/1957 | Stevenson. | |
| 2,963,143 | 12/1960 | Field. | |
| 2,997,187 | 8/1961 | Burt. | |
| 3,036,661 | 5/1962 | O'Leary | 187—1 |
| 3,050,199 | 8/1962 | McGrath. | |
| 3,055,516 | 9/1962 | Mead. | |
| 3,056,515 | 10/1962 | Anderson. | |

GERALD M. FORLENZA, *Primary Examiner.*

MORRIS TEMIN, HUGO O. SCHULZ, *Examiners.*